May 15, 1962          G. GOLUBOVIĆ          3,034,341
DEVICES FOR THE DETERMINATION OF MECHANICAL STRAINS
Filed Dec. 9, 1957
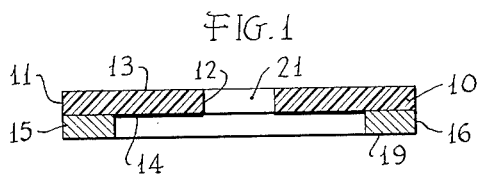
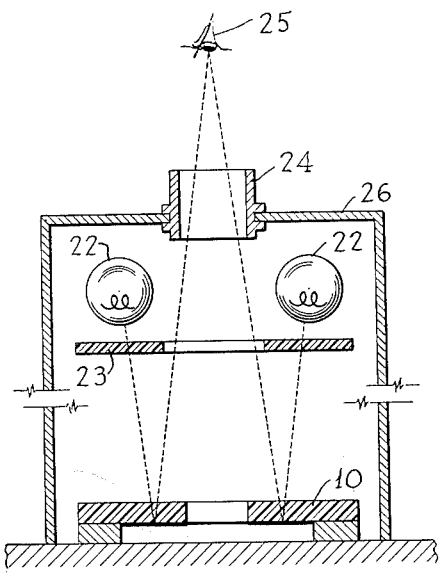
INVENTOR.
Georges Goluborić
BY
ATTORNEY ated May 15, 1962

3,034,341
DEVICES FOR THE DETERMINATION OF
MECHANICAL STRAINS
Georges Golubovic, Paris, France, assignor, by mesne assignments, to The Budd Company, Philadelphia, Pa., a corporation of Pennsylvania
Filed Dec. 9, 1957, Ser. No. 701,592
Claims priority, application France Dec. 14, 1956
7 Claims. (Cl. 73—88)

This invention pertains to devices for determining mechanical strains and more particularly to photoelastic strain indicators adapted to resolve the magnitudes and directions of principal strains in a strain field at the surface of a workpiece to which the indicators are attached.

Conventional methods of determining mechanical strains at a surface of a structure have included electrical strain gauges, mechanical strain gauges and photoelastic devices comprising a photoelectric plastic bonded to the surface under investigation. Such devices, however, are not capable of presenting, at one observation, information relating to the separate magnitudes and directions of principal strains as distinguished from principal strain difference information.

It is an object of this invention to provide a simplified photoelastic strain indicator which gives the principal directions of strains at the surface of a workpiece (and hence the principal directions of the stresses causing those strains) as well as the magnitude of the principal strains (and stresses).

A further object is to provide a strain indicator which is substantially unaffected by ambient conditions of temperature, humidity, and the like and which is of optimum sensitivity for resolving principal strain magnitudes and directions.

A still further object is to provide a strain indicator which is readily employed and interpreted by non-specialized personnel.

According to this invention a strain indicator exhibiting photoelastic strain information resolving the magnitudes and directions of principal strains in a strain field at the surface of the workpiece to which the indicator is attached, comprises a hollow photoelastic material blank having an inner surface and an outer surface encompassing the inner surface, both surfaces being intersected by a plane and defining at the intersections two closed non-intersecting edges and an attachment surface between the edges. The indicator is attached to a workpiece surface by means of an adhesive bonding material applied to the attachment surface.

Observation of the photoelastic strain information may be made with conventional photoelastic instruments. Due to their unique configuration, however, the indicators of this invention may be calibrated and graduated to provide directly without computation, the two principal strain magnitudes and directions, upon a single observation of their birefringence.

A better understanding of this invention, however, will be had upon consideration of the following explanation and of the accompanying drawing wherein:

FIG. 1 is a cross-sectional elevation of a preferred embodiment of the photoelastic strain indicator of this invention; and FIG. 2 is a schematic illustration of conventional photoelastic instrumentation for observation of the birefringence of photoelastic strain indicators according to this invention.

With particular reference to FIG. 1, the photoelastic strain indicator of this invention comprises a flat ring 10 of a photoelastic material, a plastic such as Bakelite or Celluloid which exhibits forced birefringence or forced double refraction when deformed. Surfaces 11 and 12 of the ring 10 are cylindrical and define, at their intersection with upper and lower plane surfaces 13 and 14, closed, non-intersecting edges, i.e. circles. The axial thickness of the ring 10 is a constant. The ring 10 is bonded at attachment surface 14 to a structure to be investigated or, in the form shown, indirectly by means of a second ring 15 of the same external configuration 16 as the ring 10, to a workpiece by a further bonding at 19. The internal diameter of ring 15 is greater than that of ring 10 so that a portion of the attachment surface 14 may be spaced from any structure to which the attachment is made. The surface 14 is made reflecting by conventional means.

The photoelastic strain indicator of this invention embodies a unique discovery: When the attachment surface of a photoelastic indicator is conformed to comprise two closed non-intersecting edges, patterns of birefringence are exhibited which vary, not only according to the difference between principal strains imposed upon the indicator, but in a predeterminable manner according to the magnitudes and directions of the principal strains. Strain concentrations in the vicinity of aperture 21 enhance the sensitivity.

Conventional photoelastic strain indicators exhibit patterns of birefringence which are the same at any region where a given principal strain difference is reproduced regardless of the magnitudes and directions of the individual principal strains. In the past it has been necessary to make more than one observation with differently oriented auxiliary apparatus, to resolve the principal strain information provided by a single observation with the strain indicator of this invention.

FIG. 2 illustrates the application of conventional photoelastic instrumentation with the strain indicator of FIG. 1. The auxiliary apparatus comprises a source of light 22, including optical means for projecting a beam of light into the measurement zone, and a polarizer 23 and an analyzer 24 interposed, respectively, between the light source 22 and the indicator 10, and between the indicator 10 and a viewer or a viewing position at 25. Observations may be made, conveniently, by means of a light directing instrument such as a mirror or an analogous prism system. It will be realized that circular polarizers and analyzers may be at times preferentially employed instead of plane polarizers and analyzers. A dial 26, mechanically connected to rotate an analyzer or polarizer until a previously calibrated type of stress pattern is indicated, may be calibrated to give directly the principal stress directions. Counting of fringes in the observed pattern will give the magnitudes of the principal stresses.

Any of the embodiments of this invention may be calibrated by attaching the strain indicator to the surface of a simply shaped workpiece which is loaded to produce a known biaxial stress condition and hence a known strain configuration at the workpiece surface. A resultant pattern of birefringence may be readily interpreted for recognition of the principal stress directions and for the indications concomitant with graduated magnitudes of either and both of the principal strains.

It will be apparent that since the strain indicators of this invention are symmetrical in form and the attachment surfaces are closed surfaces, external conditions such as temperature changes and humidity changes bias the entire pattern of birefringence without directional effect.

While certain preferred embodiments of this invention have been shown and described it will be understood that various modifications thereof will be apparent to one skilled in the art and, therefore, no restriction is intended

What I claim is:

1. A strain indicator exhibiting photoelastic strain information resolving the magnitudes and directions of principal strains in a strain field at the surface of a workpiece to which the indicator is attached, said indicator comprising a hollow, right, circular, cylindrical blank of photoelastic material having an annular attachment surface and bonding means bonding the indicator at the periphery of the attachment surface to the workpiece surface.

2. A strain indicator exhibiting photoelastic strain information resolving the magnitudes and directions of principal strains in a strain field at the surface of a workpiece to which the indicator is attached, said indicator comprising a blank of photoelastic sheet material shaped to define a flat ring having concentric inner and outer right cylindrical surfaces and an annular attachment surface, and bonding means bonding said indicator at the periphery of said attachment surface to the workpiece surface.

3. The strain indicator of claim 2 including a reflecting coating contiguous with said annular attachment surface.

4. A strain indicator exhibiting photoelastic strain information resolving the magnitudes and directions of principal strains in a strain field at the surface of a workpiece to which the indicator is attached, said indicator comprising a blank of photoelastic sheet material shaped to define a first flat ring having concentric inner and outer right cylindrical surfaces and an attachment surface, a second flat ring adhesively attached coaxially to said first ring at said attachment surface and having an outer diameter substantially equal to the outer diameter of said first ring and an inner diameter substantially greater than the inner diameter of said first ring for spacing said first ring from a workpiece to which said second ring is adhesively attached.

5. The strain indicator of claim 4 in which said attachment surface is a reflecting surface.

6. A strain indicator exhibiting photoelastic strain information resolving the magnitudes and directions of principal strains in a biaxial strain field at the surface of a workpiece to which the indicator is attached, said indicator comprising a stratum of photoelastic material shaped to define symmetrically about a normal axis an internal aperture having a closed edge, means attaching said stratum to said workpiece throughout an area spaced from and encompassing said edge, and reflector means interposed between said stratum and said workpiece.

7. A strain indicator for resolving the magnitudes and directions of principal strains generated at the surface of a workpiece comprising a flat washer like testpiece of photoelastic material shaped to define a circular aperture, a circular peripheral edge, and an annular inspection region between the aperture and the edge, reflector means underlaying the inspection region, and attachment means coextensive with the peripheral edge attaching the testpiece to the workpiece surface, the inspection region being spaced from the workpiece surface so as to be unattached thereto except by way of the peripheral edge.

References Cited in the file of this patent

UNITED STATES PATENTS

| 2,014,688 | Mabboux | Sept. 17, 1935 |
| 2,322,319 | Ruge | June 22, 1943 |

OTHER REFERENCES

Article titled "Photoelasticity—Mining Engineer's New Tool," published in Mining and Metallurgy, vol. 21, 1940. (Copy in 73/88, Div. 36), page 94 only.